United States Patent Office

2,871,191
Patented Jan. 27, 1959

2,871,191

GREASES STABILIZED WITH ORGANIC CARBONATES

John E. Schott, New York, N. Y., assignor to Socony Mobil Oil Company, Inc., a corporation of New York No Drawing. Application October 17, 1952
Serial No. 315,404

6 Claims. (Cl. 252—40.5)

This invention relates to lubricating grease compositions suitable for use over a wide range of operating conditions. More specifically, the present invention is concerned with the stabilization of grease compositions such that they are stable when used or stored at temperatures varying from about −70° F. to about 250° F.

In recent years, a demand has been created for greases of outstanding lubricating character, particularly for greases retaining their grease structure during use over a wide range of operating temperatures. Typical of such a demand is that created by the aircraft industry. For efficient aircraft operation, greases should have low temperature torque properties such as that they will flow properly at temperatures as low as about −70° F. In addition, the greases should be of low volatility and retain their grease structure at temperatures at least as high as 250° F. Failure to retain grease structure results in high consumption of grease and frequent servicing. Other desirable features of such greases are: homogeneity and smooth, unctuous consistency; water resistance; resistance to oxidation; resistance to oil separation; and resistance to shear or breakdown upon working or milling.

It has now been discovered that greases are effectively stabilized by incorporating therewith certain organic esters of carbonic acid (commonly referred to as organic carbonates). Such esters are represented by the following general formula:

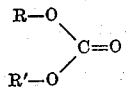

wherein R and R' are organic groups, the sum of the carbon atoms of R and R' being at least about twelve, and preferably at least about twenty. In general, the molecular weight of such esters is above about 100, preferably at least about 300.

As contemplated herein, the organic groups R and R' can be of diverse character so long as the carbon-atom sum is maintained. For example, R and R' of the organic esters of carbonic acid, can be the same or different groups, and can be such as the following: alkyl, alkenyl, cycloalkyl, aryl, alkaryl, aralkyl, ether aryl such as phenoxy phenyl, heterocyclic, hydroxy-substituted alkyl such as glycyl, thiol-substituted such as thioglycyl, thioether, thiophenyl, thionaphthyl and their substituted derivatives such as di-thio-diphenyl.

Representative of the organic carbonates contemplated herein are:

Di (butoxydiethylene glycol) carbonate
Diphenyl carbonate
Diethylene bis-phenyl carbonate
Butyl diglycol carbonate, and
Lauryl carbonate and their substituted derivatives containing such substituent groups as halogen, thio and amino.

The organic carbonates of this invention are characterized by their solubility in mineral oil and by substantially non-volatility at temperatures encountered in practically all grease lubrication. They are much less volatile than glycerine, for example. The lower molecular weight carbonates, such as ethylene carbonate, are relatively insoluble in mineral lubricating oil, while the higher molecular weight organic carbonates are soluble. For example, dibutoxy-diethylene glycol carbonate has relatively high solubility in mineral lubricating oil.

Organic esters of carbonic acid, or organic carbonates, are well known, as are methods for their preparation. Briefly, such materials can best be prepared by reacting organic hydroxy compounds with carbonyl chloride (phosgene), or by transposition of the lower boiling esters by heating with hydroxy compounds having elevated boiling points.

The organic carbonates are used in amounts of the order of from about 0.01 percent to about five percent, by weight, of the total grease composition. Amounts falling within the lower portion of this range are particularly advantageous when the grease is of semi-fluid character having a low soap content. From about 0.25 percent to about one percent is generally optimum for calcium soap-calcium acetate greases such as described in Patent No. 2,197,263, and for barium soap-barium acetate greases such as described in Patent No. 2,564,561.

The organic carbonates of this invention are effective in stabilizing greases containing alkaline earth metal soaps; that is, soaps of such metals as magnesium, calcium, barium and strontium.

The fats and fatty acids used in such greases are well known. They generally contain from about eight to about twenty-two carbon atoms per molecule. Representative of such materials are vegetable, animal and fish fatty oils, and hydrogenated fatty materials thereof. Stearin, hydroxy acids of at least about eight carbon atoms such as hydroxy decanoic acid and hydroxy-stearic acids, stearic acid, cottonseed oil acids, oleic acid, palmitic acid, myristic acid, hydrogenated fish oils such as "Hydrogenated Fish Oil, Iodine No. 77" and "Hydrofol," are typical.

The oil components of such greases can vary considerably in character. In general, such oils are characterized by a viscosity (S. U. V.) of greater than about 50 seconds at 100° F., preferably from about 100 seconds to about 5000 seconds at 100° F. In place of mineral oils, which are most often used, other oils of lubricating viscosity can also be used, in entirety or in part. Such oils include synthetic vehicles comprising esters of aliphatic dibasic acids. Typical of such synthetic oils are: di-(2-ethyl hexyl), sebacate, dibutyl phthalate, di-(2-ethyl hexyl) adipate. Other suitable oils are esters of poly alcohols and monocarboxylic acids, such as polyethylene glycol di-(2-ethyl hexoate) and dipropylene glycol dipelargonate.

It is to be understood that the greases can also contain other characterizing materials in addition to the organic carbonate dispersing agents. For example, the greases can contain grease antioxidants such as amines, phenols, sulfides, etc., and lubricity improved agents such as glycerine, free fat, free fatty acids, esters of alkyl and/or aryl acids, sulfurized fats, lead soaps, etc. It will be recognized that glycerine, lead soaps, etc., are known to have value as stabilizing agents or dispersing agents; therefore, combinations of the same and the new agents are contemplated herein. All such well-known characterizing materials do not detract from the beneficial properties imparted by the organic carbonates; rather, such characterizing materials serve to impart their customary properties to the grease.

With regard to preparing the greases of this invention, it is preferred that the organic carbonate be added at the last stages of the preparation. That is, after most of the water present in a grease kettle has been removed and after the soap or soaps have started to form aggregates or lumps, it is then most advantageous to add the carbonate.

The greases of this invention are illustrated by the examples shown in the following tables, in which are also shown for purposes of comparison greases not contemplated herein.

TABLE I

*Calcium greases containing limited amounts of calcium acetate*

|  | I | II | III | IV | V |
|---|---|---|---|---|---|
| Oleic Acid, Percent | 6.1 | 6.1 | 6.1 | 6.1 | 6.1 |
| Stearic Acid, Percent | 6.1 | 6.1 | 6.1 | 6.1 | 6.1 |
| Acetic Acid, Percent | 1.3 | 1.3 | 1.3 | 1.3 | 1.3 |
| Lime Flour, Percent | 2.8 | 2.8 | 2.8 | 2.8 | 2.8 |
| Mineral Oil, 500 SUS at 100° F., Percent | 83.7 | 83.0 | 83.45 | 82.6 | 82.6 |
| Glycerine, Percent | 0 | 0 | 0.25 | 1.1 | 0.25 |
| Di(butoxydiethylene glycol) Carbonate, Percent |  | 0.7 |  |  | 0.85 |
| Tests: |  |  |  |  |  |
| Consistency [1] | Separated | 380 | Semifluid | Semifluid | 298 |
| Reaction, CaO, Percent | 0.26 | 0.23 | 0.26 | 0.25 | 0.41 |
| Water (K. F.), Percent | 0.14 | 0.16 | 0.14 | 0.14 | 0.24 |
| Dropping Point, ° F | None |  | None | None | 197 |

[1] ASTM Designation D217-48.

The results in Table I reveal that a calcium base grease containing a limited amount of acetic acid, 1.3 percent by weight, or its equivalent 1.7 percent of calcium acetate, is not stable (grease I), nor is such a grease stabilized by glycerine in amounts of 0.25 percent and 1.1 percent (greases III and IV). However, a small amount of di(butoxydiethylene glycol) carbonate (grease II) and a combination of 0.85 percent of di(butoxydiethylene glycol) carbonate and 0.25 percent of glycerine (grease V), effectively stabilize the grease structure.

In connection with calcium base greases, it has been found that when such a grease is stabilized with water, and is later heated to a temperature in excess of 220° F. for a period of time (as 2 hours), a slurry of soap lumps and mineral oil results. In contrast, when such greases are stabilized with di(butoxydiethylene glycol) carbonate, in the absence of water, and are similarly heated, a viscous plastic product is obtained.

Examples are also given of several calcium soap-calcium acetate greases of the character described in my related application Serial No. 300,760, filed July 24, 1952 (now abandoned in favor of application Serial No. 507,486, filed May 10, 1955), of which this application is a continuation-in-part. The greases were prepared according to the following procedure, which has been found to be most advantageous. In a grease kettle provided with paddles and driven by a power unit, the following components were charged: (1) mineral oil, approximately one-quarter of the oil used, (2) alpha-hydroxy decanoic acid, (3) lime flour, (4) acetic acid, and (5) a small quantity of water. The components were paddled in the kettle and heat was applied such that the temperature was raised to 310–320° F. as rapidly as possible (about ½ hour); these temperatures were maintained for about one hour. Substantially all of the added water and water of reaction were removed at this stage of the procedure. The remainder of the mineral oil was now added in order to lower the temperature to approximately 230° F. At this state, a fatty acid such as oleic acid, stearic acid or the like, or a blend thereof, or more 2-hydroxy decanoic acid or a blend of the same with the other said fatty acids, is added. Chemical reaction occurs, with soap and water being formed. Heat is continually applied to eliminate water. As the soap begins to aggregate, or form lumps, dispersing agents such as di(butoxydiethylene glycol) carbonate, or glycerine and an organic carbonate are added. Dehydration is completed after heating for about 1½ hours at 300–310° F. Additional oil is added and heat is no longer applied to the kettle. The quantity of additional oil ("cut-back oil") so added is determined by the desired consistency of the grease product.

Typical calcium greases prepared, as described above, with and without alpha-hydroxy decanoic acid, are shown in Table II below.

TABLE II

*Greases containing soaps of hydroxy-acids*

|  | Grease A | Grease B | Grease C | Grease D | Grease E |
|---|---|---|---|---|---|
| Ingredients: |  |  |  |  |  |
| Oleic Acid | 5.3 | 5.3 | 5.86 | 5.0 | 6.8 |
| Stearic Acid | 5.3 | 5.3 | 5.86 | 5.0 | 6.8 |
| Acetic Acid | 1.13 | 1.13 | 1.26 | 1.14 | 1.45 |
| Lime Flour | 2.7 | 2.7 | 3.32 | 2.40 | 3.54 |
| Mineral Oil, 500 SUS at 100° F. | 83.64 | 83.46 | 80.61 | 84.33 | 77.75 |
| 2-Hydroxy-4,6,6 Trimethyl Heptanoic Acid | 1.13 | 1.13 | 2.10 |  |  |
| 2-Hydroxy Stearic Acid |  |  |  | 1.14 |  |
| 12-Hydroxy Stearic Acid |  |  |  |  | 2.40 |
| Glycerine | 0 | 0.20 | 0.15 | 0.23 | 0.29 |
| Di (butoxydiethylene glycol) Carbonate | 0.8 | 0.78 | 0.84 | 0.76 | 0.97 |
| Tests: |  |  |  |  |  |
| Penetrations: |  |  |  |  |  |
| Unworked | 372 | 250 | 337 | 267 | 287 |
| Worked, 60X | 380 | 272 | 339 | 280 | 282 |
| Worked, 10,000X |  | 256 | 301 | 281 | 263 |
| Dropping Point, ° F | 444 | 330 | 338 | 251 | 347 |
| Roll Stability, 2 hours [1]: |  |  |  |  |  |
| Initial |  | 91 | 149 | 99 | 98 |
| Final |  | 106 | 118 | 115 | 100 |
| Analysis: |  |  |  |  |  |
| Reaction, CaO, Percent | 0.14 | 0.28 | 0.14 | 0.22 | 0.39 |
| Water (K. F.), Percent | 0.09 | 0.19 | 0.28 | 0.17 | 0.30 |

[1] McFarlane, R. P. The Inst. Spokesman, VI, No. 12, March 1, 1943.

The results shown in Tables I and II reveal that di-(butoxydiethylene glycol) carbonate is an effective stabilizing agent.

I claim:

1. An alkaline earth metal soap grease normally susceptible to gel structure deterioration, having in admixture therewith a small amount, 0.01 percent to about 5 percent, of di(butoxydiethylene glycol) carbonate.

2. An alkaline earth metal soap grease normally susceptible to gel structure deterioration, having in admixture therewith a small amount, 0.01 percent to about 5 percent, of a mineral oil soluble organic ester of carbonic acid having a total of at least about thirteen carbon atoms per molecule.

3. The grease defined in claim 2 wherein the alkaline earth metal soap is a calcium soap.

4. An alkaline earth metal soap grease normally susceptible to gel structure deterioration, having in admixture therewith small amounts, of glycerine and 0.01 percent to about 5 percent of a mineral oil soluble organic ester of carbonic acid having a total of at least about thirteen carbon atoms per molecule.

5. A calcium soap-calcium acetate grease normally susceptible to gel structure deterioration, having in admixture therewith a small amount, 0.01 percent to about 5 percent, of a mineral oil soluble organic ester of carbonic acid having a total of at least about thirteen carbon atoms per molecule.

6. A calcium soap-calcium acetate grease normally susceptible to gel structure deterioration, having in admixture therewith small amounts of glycerine and 0.01 percent to about 5 percent of a mineral oil soluble organic ester of carbonic acid having a total of at least about thirteen carbon atoms per molecule.

References Cited in the file of this patent

UNITED STATES PATENTS

| | | |
|---|---|---|
| 1,638,014 | Mitchell | Aug. 9, 1927 |
| 2,153,137 | Dickey et al. | Apr. 4, 1939 |
| 2,337,172 | Wojcik | Dec. 21, 1943 |
| 2,340,331 | Knutson et al. | Feb. 1, 1944 |
| 2,513,680 | Schott et al. | July 4, 1950 |
| 2,651,657 | Mikeska et al. | Sept. 8, 1953 |